United States Patent Office 2,703,537
Patented Mar. 8, 1955

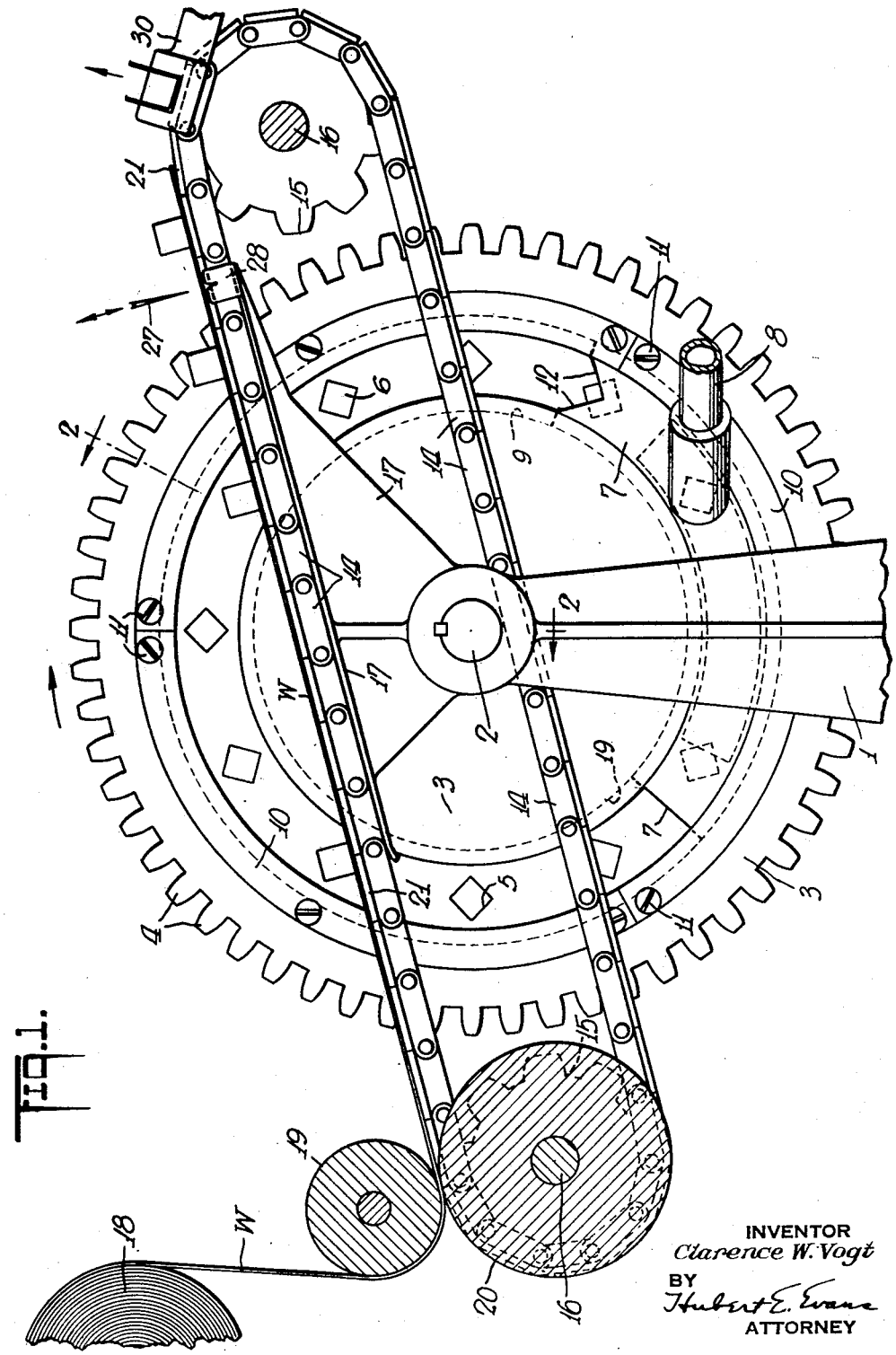

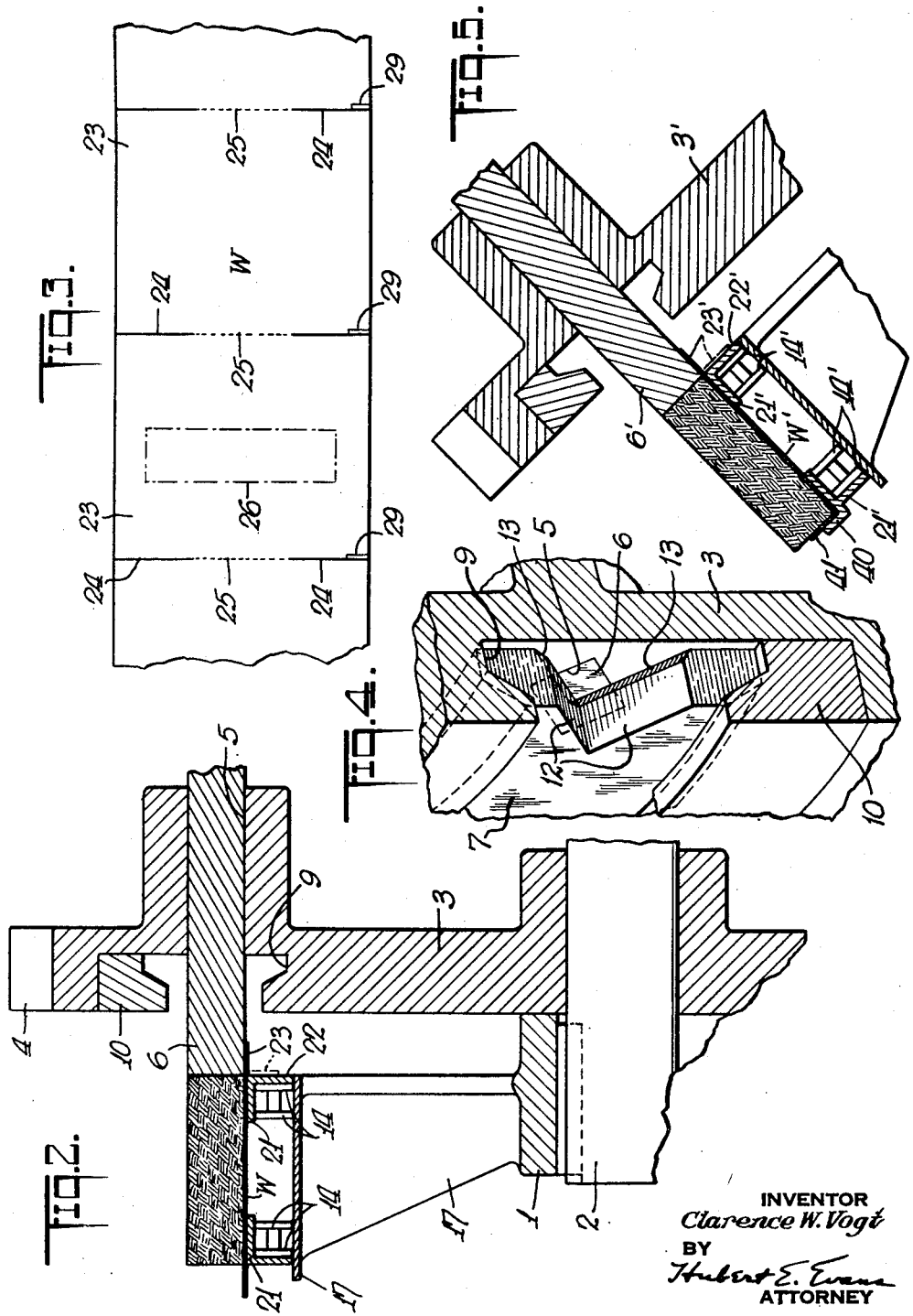

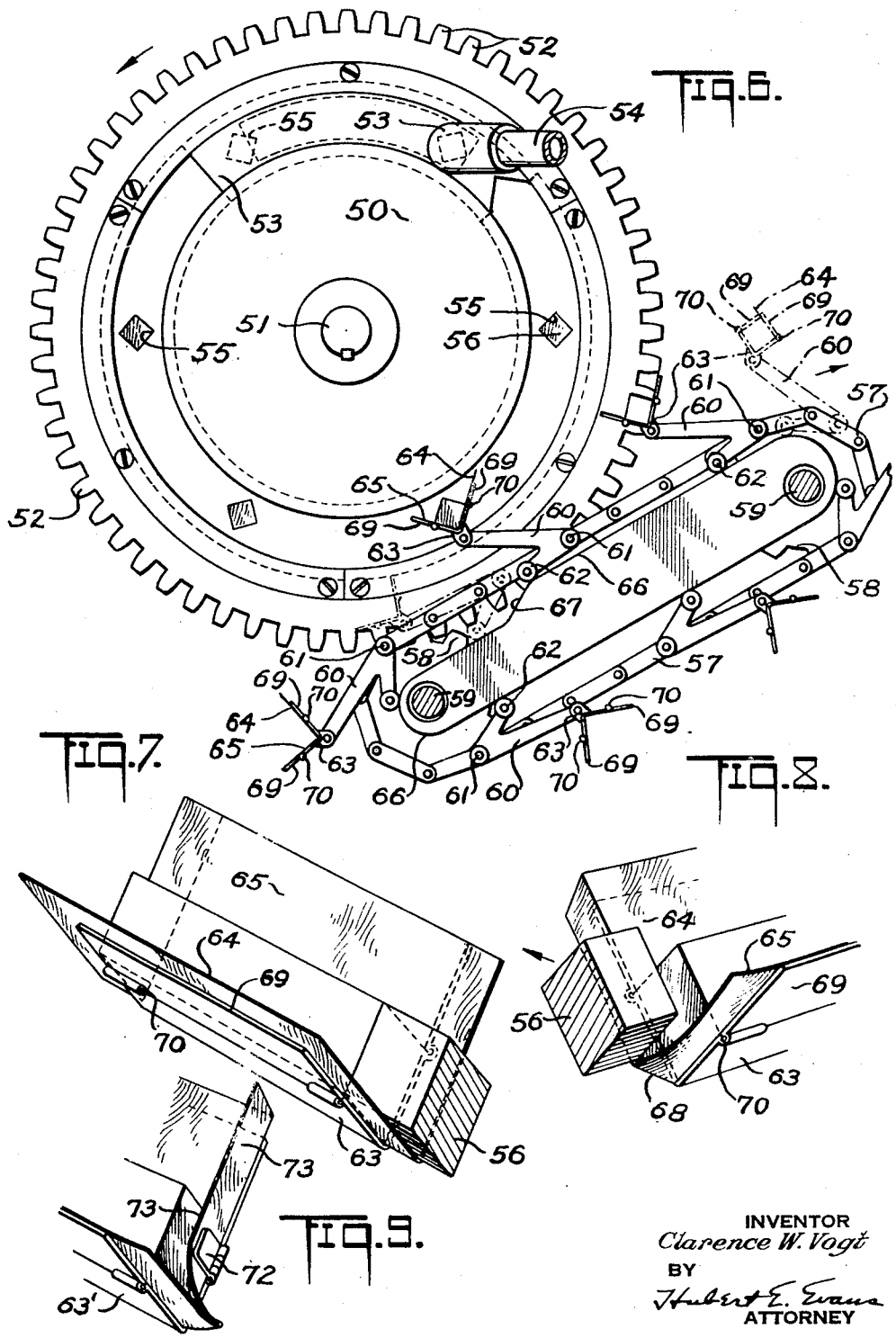

2,703,537

APPARATUS FOR FORMING AND DEPOSITING MASSES OF PLASTIC MATERIALS

Clarence W. Vogt, Norwalk, Conn.

Application June 18, 1949, Serial No. 100,065

7 Claims. (Cl. 107—8)

This invention relates to the production of masses of plastic substances and in particular to apparatus for producing measured units of plastic material which may be deposited onto enwrapments or sheet material in suitable condition for packaging said plastic masses.

This application is a continuation-in-part of my co-pending applications, Serial No. 71,195, filed January 15, 1949, and entitled Method of and Apparatus for Producing Packaged Units of Commodities, now U. S. Patent No. 2,653,430, dated September 29, 1953; Serial No. 90,852, filed May 2, 1949, and entitled Production and Packaging of Plastic Materials; Serial No. 93,599, filed May 16, 1949, and entitled Production of Plastic Masses, now U. S. Patent No. 2,665,648, dated January 12, 1954, and Serial No. 95,270, filed May 25, 1949, and entitled Production of Plastic Masses, now U. S. Patent No. 2,666,400, dated January 19, 1954.

It is an object of the present invention to provide apparatus for successively forming and depositing measured masses of plastic material onto a sequence of enwrapments or sheet material suitable for forming enwrapments so that the masses may be wrapped or packaged.

Another object is to provide apparatus for forming and depositing masses of plastic material, and particularly those plastic materials which have a tendency to adhere to surfaces which they contact, in which the mass may be deposited by a forming member onto an enwrapment or section of sheet material in such manner that the mass may be cleanly separated or removed from the forming member. In the production of masses of plastic material such as butter, margarine and the like, where it is essential that the mass be a measured amount of plastic material to conform with governmental authority, it is necessary to cleanly sever, separate, or remove each mass from its forming member or an indetermine quantity of the mass will adhere to such forming member. If a clean separation or wipe is not achieved it is necessary for the producer to provide a tolerance or overage in the amount of each plastic mass to prevent such masses from not conforming to the minimum requirement. In present commercial practices the addition of such an overage or tolerance is provided and over a period of time amounts to an appreciable cost factor due to the materials and labor expended in providing such overage. Consequently considerable savings can be obtained where such masses are accurately measured and cleanly separated from the forming member.

A further object of the present invention is to provide apparatus for producing and depositing masses of plastic material in condition for packaging in which the size, shape, and amount of individual masses may be more accurately controlled than has been possible heretofore.

Another object is to provide apparatus for producing masses of plastic material in which a series of molding units may be moved in a closed path with an intermittent or continuous motion and in which a sequence of enwrapments or portions of sheet material may be advanced with an intermittent or continuous motion along a separate path which intersects with or adjoins the path of the molding units so that deposition and separation of the masses may be accomplished in the region where such paths intersect or adjoin.

Another object is to provide apparatus for producing molded masses of plastic substance by the use of molding units or cavities having an opening equal to the smallest cross sectional area of the mass produced. In this way the filling of and expelling from the molding cavity may be accomplished in a direction perpendicular to a plane passing through the smallest cross sectional area of the resultant mass. This feature is contrary to the present commercial practices and is advantageous in that it permits adjustments to the amount of the measured mass to be performed on the smallest cross sectional area. Such adjustments may accordingly be more precisely controlled and will result in the production of more uniform and accurately measured masses.

Another object is to provide apparatus for producing formed masses of plastic material by the use of molding cavities in which the plastic material may be forced under pressure into the molding unit and may be compacted to insure complete filling of the molding unit prior to expelling a formed mass from the molding unit. This facilitates the production of plastic masses of accurately uniform size, shape, amount, and density.

A further object is to provide apparatus for forming and depositing masses of plastic material into an enwrapment in such a manner that the amount of folding required to enclose the mass for packaging is minimized. This permits packaging the masses in sheet material having increased rigidity or suitable reinforcement. In many instances a more rigid or reinforced sheet material enwrapment is desirable and may avoid the expense of a carton or overwrap without diminishing the protection afforded to the packaged commodity. Also, when a commodity is wrapped in a thin sheet material affording but little protection and later a plurality of such packages are assembled in an overwrap or carton which provides increased protection, the opening of the outer package terminates the protection afforded to the individual units. By protectively packaging each unit such protection may continue until that unit is opened for use.

A further object is to provide apparatus for producing and depositing plastic masses onto a sequence of supports which carry enwrapments for packaging the masses in which the forming mechanism may be operated on a continuous cycle while the wrapper-bearing support members may be driven with an intermittent motion.

Other objects and advantages will become apparent from the following detailed description accompanied by the drawings in which:

Figure 1 is an elevational view with parts broken away to illustrate diagrammatically a preferred form of mechanism embodying the present invention;

Fig. 2 is an enlarged fragmentary sectional view taken substantially on line 2—2 of Figure 1;

Fig. 3 is a plan view of a portion of a sequence of enwrapments which have been defined from a web of sheet material to permit packaging of the masses of plastic material;

Fig. 4 is a fragmentary perspective view of a portion of the mechanism shown in Figure 1, to illustrate the operation thereof;

Fig. 5 is an enlarged fragmentary sectional view similar to Fig. 2 but illustrating a modified form of the invention;

Fig. 6 is an elevational view in semi-diagrammatic form of another modified form of the invention;

Fig. 7 is an enlarged sectional view in perspective of a portion of the mechanism shown in Fig. 6 to illustrate the operation thereof;

Fig. 8 is an enlarged fragmentary sectional view in perspective of the mechanism illustrated in Fig. 7 at a slightly further point in the operating cycle; and Fig. 9 is an enlarged fragmentary perspective view of a construction detail of a further modified form of apparatus.

The present invention deals with the production of units or masses of a plastic substance or materials. For the purposes of this description the term "plastic substance" or "plastic material" means a semi-plastic or plastic or partially set or solidified substance which under the conditions at the time it is being acted on may be formed or molded or extruded by the use of relatively low pressures. Such materials may be flowed or forced through relatively small conduits or passages by the application of pressure. However, such materials will generally not flow under the influence of gravity to an appreciable extent. Examples of plastic materials to which the present invention may be applied are butter, margarine, lard, partially frozen confections such as ice cream, etc., and many other materials whether edible or not, having the capacity of being flowable or moldable.

In accordance with the present invention plastic masses may be produced by forcing plastic material under pressure into a molding cavity having slidably mounted therein a piston member which is retracted simultaneously with the flow of plastic material into the molding cavity. Subsequently the piston member is moved in a direction to expel a formed mass of plastic material of a predetermined size, shape, and amount from the opening to the molding cavity. The piston member may also be utilized to deposit the formed mass onto a suitable enwrapment or section of sheet material which may be folded about the mass to form an enwrapment or package.

Figure 1 illustrates in diagrammatic form equipment which may be used to accomplish the desired results. The numeral 1 indicates a portion of the frame or base to support the apparatus. A stationary shaft 2 may be mounted in fixed relation with said frame. The shaft carries for rotation a member or rotor 3 which may be driven from any suitable source of rotary power (not shown) by gears which may mesh with peripheral gear teeth 4 carried by the member 3. Opening from the end face of the rotary member 3 are one or more molding units or cavities 5. As shown in the drawings a plurality of molding cavities 5 are suitably spaced on the face of the rotary member so that they will move in a closed path. Mounted for sliding movement within each of the molding cavities may be a piston member 6. The piston members 6 may be actuated in any suitable manner (not shown) so as to move along adjacent the walls of the molding cavities. For example, each piston may be mounted on a piston rod carrying a roller follower which is influenced by the cam track of a cylindrical cam mounted in fixed relation on the shaft 2.

The drawings illustrate the molding cavities 5 and piston members 6 as square in cross section but it will be understood that there may be triangular, rod, rectangular, hexagonal, or other suitable cross sectional configurations. Mounted adjacent the face of the rotary member 3 and in line with the path of movement of the molding cavities 5 may be a stationary manifold member 7 through which plastic material under pressure may be forced from a suitable source of supply (not shown). Figure 1 shows a supply line or conduit 8 connected to the manifold 7. The manifold may be held against the face of the rotary member and is provided with a passageway therethrough to carry plastic material from the supply line through the manifold and into the molding cavities. The manifold member 7 is provided with tapering marginal portions so that the face of the manifold may be held against the face of the rotary member with the desired pressure to prevent undue leakage during movement of these parts with respect to each other. Radially inwardly of the manifold the rotary member may be provided with a tapered groove or track 9 to receive the tapered marginal portions of the manifold. At the radially outward edge of the manifold the tapered marginal portions of the manifold may be held by a removable ring member 10 which is provided with a tapered surface complementary to that of the marginal portions of the manifold. The ring member 10 is preferably split into appropriate segments to facilitate removal of the manifold when desired for cleaning or other purposes. These removable segments of the ring member 10 may be held to the rotary member in any suitable manner such as by countersunk screws indicated by the numeral 11. It is also desirable to design and construct the removable ring member 10 so that it may be adjusted in a generally radial direction with respect to the stationary shaft 2. This will vary the degree of tightness with which the manifold 7 is held against the face of the rotary member 3. Such an adjustment is important to permit a variation in the pressure with which the manifold is held to the rotary member to take up looseness which might occur due to wear of the manifold and to facilitate the handling of different types of material on the apparatus.

It is also considered desirable to be able to hold the manifold against the face of the rotor with the desired amount of clearance or pressure so that a controlled film of the plastic material may be maintained on the end face of the rotary member. Such a film of plastic material may be beneficial in lubricating and sealing the portions of the face of the manifold and rotary member which are in frictional engagement. As the molding cavities move under the manifold the piston member may be slightly withdrawn from the opening of the molding cavity and the film which has been present on the face of the rotary member during movement thereof may be collected and deposited in the molding cavity. Figs. 1 and 4 illustrate one way of accomplishing this result. It may be noted that the leading edge of the manifold in the region of the path of the molding cavities is provided with converging edge portions 12. Further, the corners of these converging edge portions 12 which abut the face of the rotary member may be undercut or chamfered as indicated by the numeral 13. The combination of the chamfered portions 13 and the converging edges 12 causes an accumulation of the film of plastic material on the face of the rotary member at the region where the converging edges 12 meet. Since this region coincides with the location of the molding cavities as they move under the manifold, the accumulated plastic material may be deposited in the opening of the molding cavity. As the molding cavity travels under the manifold the face of the rotary member may receive a fresh film of plastic material from the source of supply in the passage through the manifold but such film may be removed by the converging edge portions 12 at the entrance to the manifold during each revolution of the rotary member.

To provide a supply of plastic material flowing through the manifold to fill the molding cavities, plastic material may be fed to a hopper or other container and forced through the supply line 8 to the apparatus by a gear pump, one or more helical screws, a piston pump, or other mechanism. In many instances it is believed preferable to supply the conduit with plastic material directly from a continuous process apparatus capable of producing plastic material. The forming apparatus may be designed to accommodate the full production of plastic material and extends the continuous processing from manufacturing of the material into formation of measured units.

With a number of materials, the consistency of which may vary, it is believed desirable to maintain the material in motion to avoid affecting the consistency. According to the present invention the mechanism may be designed and constructed so that material is continuously moving through the conduit and the manifold and into the molding units or cavities in the rotary member 3.

It will also be obvious that the manifold may be of any desired arcuate extent and may even be a multiple manifold so that each molding cavity may receive partial charges of the same or different material from each station of the multiple manifold. Such an arrangement would be particularly beneficial, for example, in the production of a composite confection such as multi-flavored ice cream or the like.

Where the nature of the plastic material or the characteristics of the mass to be produced make it desirable, the present apparatus or portions thereof may be driven with a discontinuous or intermittent motion. This condition might also arise where the nature of the feed mechanism for the plastic material may cause the plastic to flow intermittently or with pulsations. A particularly desirable arrangement is to operate the mechanism for forming the masses of plastic material on a continuous operating cycle while the mechanism for supporting and advancing the sheet material or enwrapments moves on an intermittent operating cycle. The plastic material may thus be handled in a manner which will not detrimentally affect its consistency and other physical properties. At the same time the supplying and advancement of the sheet material or enwrapments may be accomplished as desired for its most advantageous operation. Coordination with other equipment is facilitated and if the enwrapment is stationary at the time of deposition of the plastic mass, accuracy of the placement of the mass and its separation or removal from the forming member may be beneficially improved.

As the rotary member 3 revolves around the shaft 2 the molding cavities successively pass under the face of the manifold 7 and when in communication with the passageway through the manifold and the plastic material under pressure disposed therein, the piston member 6 may be retracted and plastic material will flow into the molding cavity to fill the same. It is believed preferable that the piston be retracted at a rate equal to or slightly less than the flow of the plastic material into the molding cavity. In this way the piston may maintain a slight compacting effect during the forcing of the plastic material into the molding cavity.

Where the plastic material is incompressible, obviously the piston must be retracted as fast as the plastic material is forced into the molding cavity. However, many plastic materials may be compressible due to the fact that they include dissolved or undissolved gas, entrained air, or the like. It may be desirable that such materials be compacted to insure complete filling of the molding cavity.

If desired the piston may be retracted beyond the point at which the molding cavity contains sufficient plastic material to form a mass of the desired size so that the molding cavity is overfilled by any desired amount. Following this overfilling the piston member may be returned to expel any excess of plastic material from the molding cavity while the molding cavity is still in communication with the source of plastic material under pressure. This overfilling and expulsion of excess, assists in assuring that the molding cavity is completely full of plastic material, and further, subjects the plastic material in the molding cavity to pressure from opposite ends thereof. These conditions result in a compacting of the plastic material and the formation of plastic masses of uniform density, and therefore uniform weight.

It is also contemplated that the final position of the piston member may be adjusted to vary the amount of plastic material which will be disposed in the molding cavity at the time the mass of plastic is to be expelled. This may be accomplished in any one of several ways. For example, a section of the rear wall of the cam track which actuates the piston may be movable to control the volume of the molding cavity as determined by the position of the piston at the time that the molding cavity passes out of communication with the source of supply of plastic material under pressure. The adjustment of the amount of material to be disposed in each plastic mass is essential with many plastics where the physical characteristics of the plastics such as consistency or density may vary from time to time. For example, variation in physical characteristics of the plastics may be caused by an inability to completely control the manufacturing process or may be due to variations in some of the raw materials, etc.

Where the plastic material offers resistance to being forced into and completely filling the molding cavity, or where it is desired to utilize lower pressures on the plastic material, it is believed preferable to utilize a molding cavity having an increased cross sectional area as compared to the cross sectional area of the mass to be formed. Such a construction is advantageous in that it reduces the depth of the molding cavity and accordingly the distance that plastic material must be flowed to fill the molding cavity. In such a case the molding cavity may utilize a multiple piston member with the portions of the piston member moving in unison or independently of each other at the desired times during the filling and expelling of plastic material from the molding cavity. By way of illustration the portions of the multiple piston member may move simultaneously to expel a large portion of the plastic material from the molding cavity following which, one of the piston members may be moved to continue the expressing of the plastic material to a point outwardly of the molding cavity where the formed mass may be deposited in suitable condition for packaging.

After the desired predetermined quantity of plastic material has been placed in the molding cavity, movement of the rotary member 3 will cause the molding cavity to pass under the sealing edges of the manifold. The molding cavity then passes from beneath the manifold and at the desired point in its path of movement the piston member may be moved outwardly to express or expel a formed mass of plastic material from the molding cavity. In conjunction with the expelling of a formed mass, the piston member may be moved outwardly through the opening of the molding cavity to carry the formed mass and deposit the same inwardly of the marginal edge of an enwrapment or a section of sheet material adapted to become an enwrapment.

Many of the above described principles for accomplishing the filling of the molding units and the producing of formed masses of an accurate and uniform size, shape, and amount, are described and claimed in the previously referred to copending applications of which this is a continuation in part. A primary feature of the present invention is the successive deposition of formed masses of plastic material from forming units movable in one path onto a sequence of defined enwrapments or a web of material suitable for forming enwrapments while such enwrapments or sheet material are adapted to be moved in a path which intersects or adjoins the direction of movement of the path of the forming units. By way of illustration, Figs. 1 and 3 of the drawings illustrate the molding units moving in an arcuate path at the time of deposition while the enwrapments or sheet material follow a path having a straight line direction intersecting the direction of the path of the molding units. The enwrapments or sheet material may be advanced along the face of the rotary member to receiving position adjacent the intersection of the path of such advancement with the path of the molding units. After deposition, continued movement of the piston and rotary member across the path of the enwrapment creates a clean separation or removal of the mass from the piston member. The mass and its associated enwrapment may then be advanced and packaging completed.

There are a number of advantages to an arrangement of this type. For example, by varying the speed of the enwrapment advancing means, the spacing of the individual plastic masses therealong may be varied. This may be beneficial to coordinate the forming operations with other operations such as wrapping, labeling, cartoning, etc., which it may be desired to accomplish. Also the enwrapment advancing means may be used to carry the deposited plastic mass through a zone of inspection or further treatment. Such treatment may comprise decoration of the plastic mass, coating of the mass, or applying an insert for inclusion in the package to be formed. Examples of such inserts are, instructions concerning the plastic, coloring matter, premiums, or the like.

Figure 1 shows a supporting means to support suitable sheet material during its movement adjacent the end face of the rotary member 3 in a direction which intersects the direction of motion of the path of the molding cavities. The supporting means may comprise an endless conveyor formed by a pair of spaced chains made up of a sequence of pivotally connected link members 14. The chains are carried by two pairs of sprockets 15 mounted for rotation on shafts 16 which may be journaled in extensions of the frame 1 and driven from any suitable source of power (not shown). To guide and support the upper run of the conveyor chains an extension 17 of the frame 1 may be provided.

The sheet material adapted to be formed into enwrapments may be supplied to the endless conveyor from a suitable source such as a supply roll, a portion of which is indicated by the numeral 18. The web of sheet material may be drawn from the supply roll by a feed roll 19 in conjunction with a feed roll 20 mounted on the shaft 16 of the conveyor. The feed roll 20 in the form of the invention shown will only engage the web between the spaced chains of the conveyor but obviously other feed rolls could be utilized. Each of the links 14 of the conveyor chains may carry elements 21 which cooperatively provide a continuous supporting surface along the conveyor chains. The elements 21, as may be seen in Fig. 2, may be angle shaped in cross section to provide a downwardly extending apron or surface indicated by the numeral 22 in Fig. 2.

Thus, as the conveyor chains move and cause movement of the web of sheet material or enwrapments, indicated by W, portions of the web are supported by the elements 21 carried by the conveyor chains, leaving a marginal edge of the web W which is unsupported and extends inwardly from the conveyor toward the rotary member 3. This free or unsupported marginal edge is indicated by the numeral 23 in Fig. 2. As stated, the piston member 6 may deposit the formed mass of plastic material on the web at a point inwardly of the free marginal edge 23. The actuating means for the piston member may advance the piston member to a fixed point spaced outwardly from the end face of the rotary member which point may be flush or aligned with the apron or surface 22 of the elements 21. After the piston had deposited the plastic mass onto the enwrapment, as shown in Fig. 2, the piston and molding cavity may continue moving in their fixed path upon further movement of the rotary member 3. This will cause the end face of the piston to bend downwardly the marginal edge 23 of the web against the apron 22 carried by the conveyor chain. Since the mass of plastic material is supported on the enwrapment and conveyor while the piston moves past the surface of the conveyor in a downward direction, looking at Fig. 2, the plastic mass is sheared or separated from the piston face. The marginal edge 23 of the enwrapment then wipes the end face of the piston to remove any plastic material tending to cling to the piston face. With the surface or apron 22 accurately aligned with respect to the end face of the piston, the shearing action caused by the piston face moving past the apron will provide a clean removal or separation of the plastic mass from the piston with very little if any material tending to cling to the piston face. The clean separation or removal is facilitated by the fact that the cohesion of the plastic material is generally greater than its adhesion to the piston face. In addition the wiping of the marginal edge 23 of the web across the piston face will insure that a minimum of plastic material will remain on the piston. If plastic material is wiped from the piston face onto the marginal edge 23 of the web, the formation of the package which will involve the use of the marginal edge 23 to enclose the end portion of the package will place such material onto the end of the plastic mass.

Fig. 3 illustrates a plan view of one form of sheet material which may be used to provide enwrapments for the plastic masses. In this instance the web may be provided with printed matter on its underside to label the produce or carry appropriate advertising or trade-marks. At the time that the web is printed the individual enwrapment lengths may be defined in the sheet material in precise registry with the printed matter on the web. For example, the common boundary between adjacent enwrapments may be defined by partially slitting the same as indicated by the slits 24 which extend inwardly from the side edges of the web for the desired distance. The slits 24 also serve to separate the marginal edge 23 of each of the enwrapments into individual freely movable edge portions. In addition the common boundary between adjacent enwrapments may be provided with a cut score or otherwise weakened portion indicated by the numeral 25, which weakened portion may extend between and connect the slits 24.

The formed mass of plastic material deposited on the web may occupy the position indicated by dot and dash lines bearing the numeral 26 in Fig. 3. After the plastic mass has been deposited on the web, the conveyor chains will advance it and its enwrapment to a position where the web may be severed into individual enwrapments so that each mass may be individually wrapped or packaged. Figure 1 illustrates diagrammatically one way in which this may be accomplished. A reciprocating knife, a portion of which is indicated by the numeral 27, may be mounted above the conveyor and actuated to move between the spaced masses of plastic material to sever the web along the common boundary between adjacent enwrapments formed by the slits 24 and the weakened or cut scored portion 25. To facilitate this cutting action a back-up member or block 28 may be mounted on an extension of the support member 17 and extending upwardly between the spaced conveyor chains to a point in line with the bottom surface of the web. In the form of the invention illustrated, severance is only required for the extent of the weakened portion 25 which may correspond to the space between the elements 21 carried by the conveyor chains. To facilitate precise registry of the severance effected by the knife member 27 with the weakened portion 25 previously formed in the web, the web may be provided with any suitable registry indicia. For example, spots or areas indicated by the numeral 29 in Fig. 3 may be located on the web and such spots 29 may be scanned by an electric eye mechanism which is connected so as to control the timing of the knife member 27.

After the web has been severed into individual enwrapment lengths, each of which has deposited thereon a formed mass of plastic material, the conveyor may move the individual enwrapments to a location where the enwrapment may be folded to form it around the plastic mass and provide a completed package. These wrapping operations may be readily done on any of several mechanisms which are conventional and well known in the wrapping art. As illustrative of these operations, Figure 1 shows in diagrammatic form, a member 30 which may be actuated to move from under the conveyor and lift the enwrapment and plastic mass therefrom to transfer the same to another location for completing the packaging. The member 30 may, if desired, be provided with a pocket or recess of suitable size and shape to enfold the leading and trailing portions of the enwrapment onto the sides of the plastic mass as it lifts or scoops the mass from the surface of the conveyor.

Fig. 5 illustrates a modified form of the invention for handling certain types of plastic materials. In the form of the invention shown in Figs. 1 and 2 the rotary member is positioned to rotate about a horizontal axis. This means that the formed mass of plastic material is extruded in a horizontal direction and requires that the plastic material have a relatively stiff consitency so that it may be self-supporting during its movement outwardly from the molding cavity prior to being deposited by the piston member on the enwrapment. Fig. 5 illustrates a rotary member 3' having its end face at an angle to vertical. This arrangement may be accomplished by tilting the mechanism shown in Figs. 1 and 2 so that the stationary shaft carrying the rotary member is disposed at the desired angularity. It may be noticed that the conveyor mechanism including the links 14' and the platform elements 21' carried thereby are also tilted. Looking at Fig. 5 it may be seen that the piston member 6' will express the formed mass of plastic material in a downhill path and deposit the same onto the web W' supported on the conveyor. It is believed that this arrangement may be more desirable for handling plastic materials having a less rigid consistency. It is also contemplated that in some cases it may be desirable to tilt the apparatus in an opposite direction so that the plasic material may be expressed or extruded in an upwardly direction of an appropriate angularity.

To retain the mass of plastic material in the desired position with respect to the enwrapment or sheet material the chain of the conveyor which is disposed outwardly with respect to the face of the rotary member 3' may be designed and constructed so that the elements 21' which it carries may have an upwardly extending flange or lip 40. Prior to or simultaneously with the placement of the web of sheet material onto the conveyor table the outwardly disposed marginal edge of the web, indicated by the numeral 41 in Fig. 5, may be folded upwardly to conform and lie against the flange 40. In othe rrespects the sequence of operations may be accomplished similar to that described in connection with Figs. 1 and 2. The plastic material may be forced from a source of supply into the molding cavity to fill the same with the desired predetermined amount of plastic. The rotary member 3' may be moved to the desired position and a formed mass of plastic material expelled by the piston member onto the enwrapment. Additional movement of the rotary member will then cleanly separate the plastic mass from the end face of the piston member and the intersection of the paths of movement of the piston member and the conveyor will cause the piston member to fold downwardly the marginal edge 23' of the sheet material web against the surface 22' of the elements 21', thus wiping the free marginal edge 23' across the end face of the piston member. The wrapping or packaging of the plastic mass may be completed in any desired manner.

A number of varying types of enwrapments may be utilized with the present apparatus and the section of an appropriate one will depend upon the type of package desired and in some cases on the plastic material to be packaged. While in many respects a prefabricated or preformed enwrapment may be desired it is also possible to utilize a rolled web of sheet material and to form or define individual enwrapments in conjunction with the deposition and packaging of the plastic mass. A web of suitable sheet material may be fed to the enwrapment advancing means and the individual enwrapments defined therein as the web is intermittently or continuously fed along its path. Obviously any desired printing matter may be imprinted on the web as a part of the same operation and in addition the web may be coded or provided with other means which will be useful in packaging operations, including score lines, adhesive spots or areas, fold lines and the like.

While the drawings illustrate the web as lying in a plane it may be desirable to support it in recesses or pockets of an appropriate configuration. Also the enwrapments may be fed as a spaced sequence appropriately registered to their receiving position. For examples of enwrapments which may be utilized, reference is made to my copending applications Serial No. 56,942 filed October 28, 1948, and entitled Wrappers; Serial No. 73,295 filed January 28, 1949, and entitled Chained Enwrapments (now abandoned); and Serial No. 83,044 filed March 23, 1949, and entitled Articles for Use in Packaging (now abandoned). These applications also illustrate the advantages of utilizing a connecting means between adjacent enwrapments for the purpose of facilitating their advancement and use.

Figs. 5 through 8 of the drawings illustrate an embodiment of the invention adapted to utilize formed receptacles or pockets to hold enwrapments into which the masses of plastic may be deposited. Such an arrangement is exceedingly advantageous in insuring precise and accurate registry of each mass of plastic material with its enwrapment and results in wrapped packages of commodities which are uniform in appearance.

Fig. 6 shows a forming mechanism similar to that previously described in connection with Figs. 1 through 4. In this modification a rotary member 50 which is mounted on a stationary shaft 51 and may be driven by peripheral gear teeth 52, is rotated in a counter-clockwise direction, looking at Fig. 6. A manifold member 53 is disposed in abutment with the upper portion of the face of the rotary member 50. Plastic material is supplied to the manifold through a supply conduit 54 from a suitable source of supply of plastic material under pressure. Such material may be flowed through the manifold and into each of a series of molding cavities 55 opening from the end face of the rotary member 50 to completely fill the cavities 55. Each molding cavity 55 has mounted for sliding movement therein a piston member 56. The filling of the molding cavities 55, actuation of the piston members 56, and formation of the plastic masses may be accomplished in the same manner as has been described, with deposition of the masses occurring in the lower portion of the travel of the molding cavities when looking at Fig. 6.

A sequence of enwrapments may be carried for presentation at a receiving station by an endless conveyor disposed generally below the rotary member 50. The conveyor may comprise one or more spaced endless chains 57 made up of pivotally connected links and trained around spaced sprockets 58 carried for rotation on driven shafts 59. At suitably spaced intervals along the chains 57, bell crank members 60 may be mounted for pivotal movement about pins 61 which may also be the pivot pins for the links of the chain 57. One free arm of each of the bell crank members 60 may carry a roller follower 62 while the other free arms of the bell crank members 60 may carry support members 63 with V-shaped surfaces provided thereon for receiving and advancing enwrapments having a V-shaped configuration.

The enwrapments shown comprise sections of sheet material having an edge portion thereof folded over upon the remainder of the section to form a V-shaped article. The enwrapment is dimensioned to correspond to the plastic mass to be produced. The leading side or leg 64 of the enwrapment may have a greater length than the trailing side or leg 65. In connection with a plastic mass which is square or rectangular in cross section, each side of the enwrapment may be of sufficient extent to cover or substantially cover two sides of the mass. The longer side of the enwrapment may have additional length to provide a suitable overlap on the finished package when the enwrapment is folded to tubular configuration. If desired the V-shaped article may have sides of equal length so that the sheet material may enclose the mass with each side provided with a marginal portion which may be in engagement to form a fin type of seam. Such articles and the resultant packages are disclosed in my previously referred to copending application Serial No. 83,044.

The folded enwrapments may be supplied to the apparatus shown in Fig. 6 and placed in the support members 63 in any suitable manner. As the support members are advanced to the receiving station by the conveyor chain 57 they may be guided and supported in the desired position by contact of the roller follower 62 with a stationary cam member 66 supported between the conveyor shafts 59.

The position of approach is shown in dot and dash outline in Fig. 6 and it may be noticed that the support member 63 does not interfere or extend into the path of the molding cavities 55. When deposition is to be accomplished the cam member 66 may have an incline indicated by the numeral 67 in Fig. 6 to pivot the bell crank members 60 about the pins 61 and provide an additional movement of the support members 63 so that they closely adjoin the path of the molding cavities and mesh with the particular cavity from which a plastic mass is being expelled and deposited. At the time of deposition the apex of the enwrapment is at the apex of the V-shaped surfaces of the support member which is in the correct position so that a corner edge of the mass of plastic material may be received in alignment therewith. The piston member 56 has advanced outwardly from the molding cavity and deposited the formed mass inwardly of the marginal edge of the enwrapment. This is clearly shown in Fig. 7 which is a section through the piston member looking outwardly away from the face of the rotary member 50.

The face of the piston member is flush with the end of the support member 63 so that movement of the rotary member 50 at an appropriate speed will cause the piston to move with respect to the support member 63 and remove the mass of plastic from the face of the piston. Also, the face of the piston is wiped on the marginal edge of the enwrapment to remove any plastic tending to adhere thereto. This action is illustrated in Fig. 8 which is a view similar to Fig. 7 with the piston partially separated from the plastic mass. It may be noted that the movement of the piston has refolded the apex of the enwrapment along a line which defines the movement of the piston with respect to the mass. The numeral 68 in Fig. 8 indicates the fold or crease formed in the enwrapment by the piston.

It has been found that the partially enclosed piston even though it may have relatively sharp edges, can be removed from the enwrapment without damage to the enwrapment by such a movement. It appears that this may be done and will effect an excellent wipe of the piston face if the angle between the direction of movement of the piston and the edge of the support member against which the wipe is made (the edge of the leading V-shaped surface of the support member 63 in Fig. 8) is not greater and preferably slightly less than 45°.

After the mass has been separated from the piston and the face of the piston wiped, the support member bearing a partially wrapped mass is advanced along the conveyor. By this time the path of the support members no longer adjoins that of the molding units or the rotary member 50 and if desired wrapping operations may be accomplished while the mass is still held by the support member 63. It is believed preferable to fold the enwrapment to tubular configuration around the mass and this may be readily done by providing pivotally movable flaps or folding members 69 along the free edges of the V-shaped surfaces of the support members 63. These members 69 pivot about pivot pins 70 and in their closed position appear as shown in dot and dash outline at the right hand side of Fig. 6. It is then only necessary to form suitable end folds to provide a completed package containing a plastic mass.

The enclosing of the plastic by a V-shaped enwrapment is extremely advantageous because the amount of folding required as compared to that in connection with flat sheets is appreciably reduced to form a tubular configuration. This permits the use of more rigid sheet material or reinforced sheet material which in present commercial practices is not practicable. Thus each mass may have a protective enwrapment with adequate strength so that additional overwraps or cartons are not necessary. In a competitive field where packaging must be protective and at a low cost, the present invention provides an important solution to packaging problems. For example, laminated sheet materials may be utilized to obtain protection against moisture and vapor transmission while affording structural strength to the singly wrapped package.

The form of the invention shown in Figs. 6, 7, and 8 is also desirable since there is greater access to the face of the rotary member 50. This means easier cleaning and/or repairing of the apparatus. Further, greater space is provided for the manifold 53 and the rotary member 50 may be operated at speeds best adapted for complete and proper filling of the molding cavities with the plastic material. Also, lower pressures may be applied to the plastic to minimize any harmful effects of placing the plastic under pressure.

Fig. 9 shows a modified detail of construction which may be incorporated in the apparatus shown in Figs. 6 through 8. It is a view of the end of a support member 63' spaced outwardly from the rotary member at the time or subsequent to deposition of a plastic mass. If the apparatus shown in Figs. 6 through 8 be tilted at a desired angle a flap member 72 may be raised to form a flange or lip similar to the lip 40 in Fig. 5 to support and retain the plastic mass against movement. The folding of the flap members 72 may be accomplished by any suitable mechanism (not shown) and enfolds the outward marginal edge of the enwrapment indicated by the numeral 73 against the end face of the plastic mass.

To provide greater flexibility of the apparatus it is contemplated that the enwrapment supporting and advancing means may be disposed so that it moves past two or more assemblies of forming units for producing plastic masses. The endless conveyor may be lengthened and the enwrapment supporting run thereof may pass across the face of a pair of rotary members. If desired the first rotary member may deposit a plastic mass at every second enwrapment position with the other of the pair of rotary members depositing a plastic mass in each of the remaining enwrapment positions. This means that the enwrapment advancing means will move two stations for each deposition by the rotary members, and if desired the enwrapments carrying the plastic masses deposited by the first rotary member may be removed in the space between rotary members. In the case of the form of the invention shown in Figs. 6 through 8, the adjacent support members 63 may be constructed so that their associated roller followers 62 are influenced by separate cam members similar to the cam 66. This will permit actuating one of the adjacent support members into receiving position at each of the forming units.

To hold the enwrapments in proper and accurate registry with respect to the mass deposited, it may be desirable to incorporate a suitable gripping means for the sheet material or enwrapments. For example, the conveyor may be provided with vacuum ports from which air may be exhausted to hold a web of sheet material thereto. In the case of separate enwrapments the support members may be provided with vacuum or other suitable gripping means.

A tandem arrangement comprising a plurality of forming units to deposit onto a single conveyor may be utilized to advantage since a change in the rate of production may be accomplished by varying the feed of the conveyor and utilizing the required number of forming units. Where it is desired to produce a package incorporating two or more plastic masses, whether of the same or different materials, a tandem arrangement could be beneficially utilized. A multi-flavored confection could be readily produced by depositing a plurality of plastic masses each of a different flavor onto the same enwrapment, one such mass being deposited by each rotary member. As previously mentioned the conveyor member and/or the forming units may be moved continuously or intermittently by any suitable driving means which are considered conventional and do not require detailed description.

It may be noted that the angular direction of movement of the conveyor may be modified so that it approaches the path of the forming units to intersect or adjoin their path at any suitable angle. In the position illustrated in Figure 1 the plastic mass is deposited on the conveyor with a flat side or panel of the mass contacting the sheet material. If the angle of the conveyor were changed a corner edge of the plastic mass may be presented to the plane of the enwrapment and continued movement of the piston and rotary member would cause a' twisting movement of the plastic mass with respect to the piston member which may beneficially assist in removing or separating the mass from the piston member.

In the case of many plastic materials sanitation of the equipment is a necessity and to facilitate frequent and periodic cleaning of the apparatus, the conveyor member may be mounted so that it is movable with respect to the rotary member to provide greater access for cleaning or sterilizing the molding cavities, piston members, etc.

While the manifold member has been illustrated as a stationary member mounted or clamped against the face of the rotary member, it may be desirable to utilize a movable manifold which moves into contacting engagement with a molding cavity as the molding cavity reaches the position where it is to be filled with plastic material. It is believed that this may be particularly desirable when the rotary member is driven in an intermittent moving cycle so that the molding cavity may move into its filling position. The manifold member may then move into abutment with the molding cavity and a suitable sealing member be used to surround the manifold and prevent leakage of plastic material around the edges of the manifold.

It will be understood that the foregoing description of preferred embodiments of the invention is for the purpose of explanation and illustration and numerous variations and modifications other than those which have been described, may be made without departing from the spirit of the invention.

What I claim is:

1. Apparatus for producing formed masses of plastic material which comprises a plurality of molding units mounted for movement in a closed path and having openings in a single plane, means to introduce plastic material into said molding units, a plurality of support elements movable in a closed path and having edge portions disposed in a plane parallel to the plane of the openings to said molding units, said molding units and said support elements being in alignment at a predetermined location where their paths of movement are in proximate relationship, means for transferring said formed masses of plastic material from said molding units onto said support elements at said predetermined location, and means for separating said masses from said transferring means to deposit said masses on said support elements.

2. In apparatus for producing masses of plastic material, a plurality of molding units mounted for movement in a closed path, said molding units having expelling openings disposed in a single plane, a plurality of support elements movable in a closed path and having edge portions disposed in a plane parallel to the plane of the expelling openings of said molding units, means for expelling masses of plastic material from said molding units at a predetermined point in the path of said molding units when said molding units approach alignment with said support elements, and means for moving said molding units and expelling means with respect to said edge portions of said support elements to separate said masses of plastic material from said expelling means and deposit the same onto said support elements.

3. In apparatus for producing masses of plastic material, a plurality of molding cavities mounted for movement in a closed path and having expelling openings disposed in a single plane, a piston member slidably mounted in each of said molding cavities, a plurality of members adapted to carry enwrapments movable in a closed path which adjoins the path of said molding cavities at one location, said last named members having edge portions disposed in a plane parallel to the plane of the expelling openings of said molding cavities and spaced inwardly from a marginal edge of enwrapments carried thereby, actuating means for said piston member to expel masses of plastic material and deposit the same onto said enwrapments when said molding cavities and enwrapment bearing members are in alignment, and means for moving said molding cavities and piston members with respect to said edge portions of said members to separate said masses of plastic material from said piston members and to wipe the faces of said piston members on said marginal edges of said enwrapments.

4. In apparatus for producing masses of plastic material, a plurality of molding cavities mounted for movement in a closed path and having expelling openings disposed in a single plane, a piston member slidably mounted in each of said molding cavities, a plurality of members adapted to carry enwrapments movable in a closed path adjacent the path of said molding cavities at one location, said last named members having edge portions disposed in a plane parallel to the plane of the expelling openings of said molding cavities and adapted to be spaced inwardly from a marginal edge of enwrapments carried thereby, actuating means for said piston member to expel masses of plastic material and deposit the same onto said enwrapments when said molding cavities and enwrapment bearing members are in alignment, and means for accelerating said molding cavities and piston members with respect to said edge portions of said members to separate said masses of plastic material from said piston members and to wipe the faces of said piston members on said marginal edges of said enwrapments.

5. In apparatus for producing plastic masses, a plurality of molding units mounted for movement in a closed path, a plurality of receiving members movable in a direction which brings said members into alignment with said molding units at a predetermined location, means to introduce plastic material into said molding units, means for expelling plastic masses from said molding units and depositing the same onto said receiving members at said predetermined location, means for moving said molding units in a continuous operating cycle, and means for moving said receiving members in an intermittent operating cycle.

6. Apparatus for producing measured masses of plastic material which comprises, a rotary member, a plurality of molding cavities opening from a face of said rotary member, a piston member slidably mounted in each of said molding cavities, means for filling said molding cavities with plastic material while retracting said piston members, an endless conveyor mounted for movement adjacent the face of said rotary member, a plurality of supports for carrying sections of sheet material mounted for movement with said conveyor, said conveyor being actuated to move said supports in a direction different from the path of said molding cavities, and means for actuating said piston members to deposit a mass of plastic material on a section of sheet material when said supports and molding cavities move into alignment.

7. Apparatus for producing formed masses of plastic material which comprises a plurality of molding units mounted for movement in a closed path and having openings in a single plane, means to introduce plastic material into said molding units, a plurality of support elements movable in a closed path and having edge portions disposed in a plane parallel to the plane of the openings to said molding units, said molding units and said support elements being in alignment at a predetermined location where their paths of movement are in proximate relationship, and means for transferring said formed masses of plastic material from said molding units onto said support elements at said predetermined location.

References Cited in the file of this patent

UNITED STATES PATENTS

| 15,293 | Hamer | July 8, 1856 |
| 691,737 | Armstrong | Jan. 28, 1902 |
| 879,544 | Hicks | Feb. 18, 1908 |